UNITED STATES PATENT OFFICE.

CHARLES E. GRIFFING, OF SALT LAKE CITY, UTAH.

EXPLOSIVE.

979,476.     Specification of Letters Patent.     Patented Dec. 27, 1910.

No Drawing.     Application filed August 24, 1910. Serial No. 578,770.

*To all whom it may concern:*

Be it known that I, CHARLES E. GRIFFING, a citizen of the United States, residing at Salt Lake City, in the county of Salt Lake and State of Utah, have invented certain new and useful Improvements in Explosives, of which the following is a specification.

The purpose of my invention is to provide a high power explosive which is easily and quickly manufactured and without machinery or specially prepared apparatus for making it, one that may be handled and manipulated without injury or danger of explosion, one that does not generate dangerous or harmful gases when exploded, and one that will retain its strength for any length of time and in any climate if kept dry. These objects I accomplish by the manipulation and proportionate mixture of the following ingredients. I use sugar 35% and just enough water to dissolve it. This is boiled slowly until the syrup thus formed will harden when cooled. Then remove from the heat and stir into this, powdered chlorate of potash 40%. When the mass is manipulated or stirred until it is of the consistency of soft putty it is granulated by rubbing it through a screen of about 20 mesh, the different grades of explosive requiring different size particles. When thoroughly dried, mix with this granulated mass, the following powdered ingredients: black oxid of manganese 10%, coal 10% (either stone coal or charcoal) and sugar of milk 5%.

This explosive may be fired by electric battery or the common fuse without using a cap and its explosive force is largely up and outward instead of downward.

Having thus described my invention, I desire to secure by Letters Patent and claim:

An explosive consisting of a granulated mixture of chlorate of potash 40%, and sugar 35%, mixed with comminuted coal 10%, black oxid of manganese 10%, and sugar of milk 5%.

In testimony whereof I have affixed my signature in presence of two witnesses.

CHARLES E. GRIFFING.

Witnesses:
SAM RANEY,
W. R. WILLIAMS.